2,915,549
PROCESS FOR PREPARING 1-CYANO-2-CHLORO-ETHYL ACETATE

Robert M. Nowak, Midland, Mich., assignor to The Dow Chemical Company, Midland, Mich., a corporation of Delaware No Drawing. Application September 24, 1958
Serial No. 762,936

8 Claims. (Cl. 260—465.4)

This invention relates to an organic chemical reaction, and is more particularly concerned with an improved process for the synthesis of 1-cyano-2-chloroethyl acetate.

A known procedure for the preparation of 1-cyano-2-chloroethyl acetate includes the preparation of the cyanohydrin of chloroacetaldehyde via the reaction of the aldehyde with an alkali metal cyanide in an acid medium, and subsequent acetylation with acetic anhydride or acetyl chloride to produce the 1-cyano-2-chloroethyl acetate. This procedure requires two steps and usually results in relatively low yields.

It is an object of the present invention to provide a one-step process for the preparation of 1-cyano-2-chloroethyl acetate directly from chloroacetaldehyde. A further object of the present invention is the provision of a process which includes contacting in a non-acidic medium an inorganic cyanide with chloroacetaldehyde and separating 1-cyano-2-chloroethyl acetate. Other objects will become apparent hereinafter.

The invention is based on the discovery that the reaction of chloroacetaldehyde with an inorganic cyanide in non-acidic aqueous media at a temperature below 30° C. produces 1-cyano-2-chloroethyl acetate in one step and in relatively high yields.

The process of the present invention includes contacting the inorganic cyanide with chloroacetaldehyde, preferable by the dropwise or otherwise regulated addition of the aldehyde contained in an aqueous solution to an aqueous solution of the cyanide. While sodium cyanide is generally used, other inorganic cyanides such as, for example, potassium, lithium, and ammonium cyanides may also be employed. Stoichiometrically, the reaction of the present invention requires 2 moles of chloroacetaldehyde per mole of cyanide. It has been found that very low yields, if any product, are obtained with less than a stoichiometric quantity of cyanide. Therefore, a stoichiometric excess of cyanide is usually employed. Stated as a mole ratio, a mole ratio of cyanide to chloroacetaldehyde above 0.5 to 1.0 is maintained, and the mole ratio is desirably at least 1.0 to 1.0. The temperature of the reaction is maintained below 30 degrees centigrade, but at a temperature at which the reaction medium is at least partially liquid. Preferably, the temperature is maintained between —15° C. and +15° C., desirably between —10° C. and 0° C. The reaction is exothermic, therefore a regulated contacting of the reactants is usually employed, so as to prevent excessive heating of the reaction mixture with concomitant production of undesirable side reactions and by-products. The pH of the reaction medium is maintained non-acidic, that is, above 7, preferably at about 9 to about 13 and desirably at about 11 to 12. Separation of the 1-cyano-2-chloroethyl acetate is readily accomplished by extraction with ether, or other non-polar solvent such as, for example, chloroform, carbon tetrachloride, methylene chloride, etc., and subsequent removal of the solvent, as by distillation.

The process of the present invention may be further illustrated, but is not to be construed as limited, by the following examples:

Example I

A charge of 196 grams (4.0 moles) of sodium cyanide in 800 milliliters of water contained in a reaction vessel equipped with a thermometer, reflux condenser, and stirrer was cooled to —5° C. The reaction temperature was maintained at —10 to 0° C. while 780 grams (4.0 moles) of 40 percent aqueous chloroacetaldehyde was added dropwise. After the addition was complete, the organic layer was extracted with ether, the ether layer separated and thereafter distilled through a 12-inch x 1 inch Holtzman column. The 1-cyano-2-chloroethyl acetate was obtained at 53–56° C. at 0.4 millimeter of mercury pressure absolute, having an index of refraction $n_D^{35}$, of 1.4367. The yield was 295 grams (84 percent of the theoretical).

Analysis.—Calculated: C, 40.68; H, 4.06; Cl, 24.07; N, 9.50. Found: C, 40.76; H, 4.11; Cl, 24.24; N, 9.62.

Example II

In a manner similar to that of Example I, the reaction of 0.5 mole chloroacetaldehyde with 0.3 mole of sodium cyanide in 100 milliliters of water, gave 0.19 mole (77 percent of theoretical) of 1-cyano-2-chloroethyl acetate.

In a manner similar to the above examples, other inorganic cyanides, such as, for example, potassium cyanide, lithium cyanide, and ammonium cyanide may be substituted for the sodium cyanide with similar results.

Various modifications may be made in the present invention without departing from the spirit or scope thereof, and it is to be understood that I limit myself only as defined in the appended claims.

What is claimed is:

1. The process of preparing 1-cyano-2-chloroethyl acetate which comprises contacting at least a 0.5 to 1.0 mole ratio of an inorganic cyanide, selected from the group consisting of ammonium and the alkali metal cyanides, with chloroacetaldehyde in an aqueous non-acidic liquid phase reaction medium maintained at a temperature below about 30° C.

2. The process of preparing 1-cyano-2-chloroethyl acetate which comprises contacting at least a 0.5 to 1.0 mole ratio of an inorganic cyanide selected from the group consisting of ammonium and the alkali metal cyanides, with chloroacetaldehyde in an aqueous non-acidic liquid phase reaction medium maintained at —15° C. to +15° C.; and, separating the 1-cyano-2-chloroethyl acetate from the reaction mixture.

3. The process of preparing 1-cyano-2-chloroethyl acetate which comprises contacting at least a 0.5 to 1.0 mole ratio of an inorganic cyanide, selected from the group consisting of ammonium and the alkali metal cyanides, with chloroacetaldehyde in an aqueous non-acidic liquid phase reaction medium maintained at —10° C. to 0° C., and, separating the 1-cyano-2-chloroethyl acetate from the reaction mixture.

4. The process of preparing 1-cyano-2-chloroethyl acetate which comprises contacting at least a 0.5 to 1.0 mole ratio of sodium cyanide with chloroacetaldehyde in an aqueous non-acidic liquid medium maintained at a temperature below 30° C.; and separating the 1-cyano-2-chloroethyl acetate from the reaction mixture.

5. The process of preparing 1-cyano-2-chloroethyl acetate which comprises contacting at least a 0.5 to 1.0 mole ratio of sodium cyanide with chloroacetaldehyde in an aqueous non-acidic liquid medium maintained at —10° C. to 0° C.; and separating the 1-cyano-2-chloroethyl acetate from the reaction mixture.

6. The process of preparing 1-cyano-2-chloroethyl acetate which comprises contacting at least a 0.5 to 1.0 mole ratio of sodium cyanide with chloroacetaldehyde in an aqueous liquid medium maintained at —10° C. to 0° C. and at a pH of about 12, and separating the 1-cyano-2-chloroethyl acetate from the reaction mixture.

7. The process of preparing 1-cyano-2-chloroethyl acetate which comprises contacting a 1.0 to 1.0 mole ratio of sodium cyanide with chloroacetaldehyde in an aqueous liquid medium maintained at —10° C. to 0° C. and at a pH of about 12, and separating the 1-cyano-2-chloroethyl acetate from the reaction mixture.

8. The process of preparing 1-cyano-2-chloroethyl acetate which comprises contacting at a rate such that the temperature is maintained at —15° C. to +15° C. at least a 0.5 to 1.0 mole ratio of an inorganic cyanide, selected from the group consisting of ammonium and the alkali metal cyanides, with chloroacetaldehyde in an aqueous medium and at a pH of about 9 to about 13, and separating the 1-cyano-2-chloroethyl acetate from the reaction mixture.

References Cited in the file of this patent
UNITED STATES PATENTS
2,397,520    Lichty _____ Feb. 5, 1946

OTHER REFERENCES
Houben et al.: Ber. 59, 2401 (1926).